United States Patent
Kamata

(10) Patent No.: US 8,971,081 B2
(45) Date of Patent: Mar. 3, 2015

(54) HIGH VOLTAGE INVERTER DEVICE FOR DELIVERING A HIGH-POWER AC HIGH VOLTAGE

(75) Inventor: Hisahiro Kamata, Iwanuma (JP)

(73) Assignee: Ricoh Company, Ltd., Tokyo (JP)

(*) Notice: Subject to any disclaimer, the term of this patent is extended or adjusted under 35 U.S.C. 154(b) by 429 days.

(21) Appl. No.: 13/072,299

(22) Filed: Mar. 25, 2011

(65) Prior Publication Data

US 2011/0235382 A1 Sep. 29, 2011

(30) Foreign Application Priority Data

Mar. 26, 2010 (JP) ................................ 2010-071501
Feb. 16, 2011 (JP) ................................ 2011-030564

(51) Int. Cl.
*H02M 7/537* (2006.01)
*H02M 3/335* (2006.01)
*H02M 7/48* (2006.01)

(52) U.S. Cl.
CPC ........ *H02M 7/48* (2013.01); *H02M 2007/4815* (2013.01); *Y02B 70/1441* (2013.01)
USPC ........................................ 363/131; 363/21.02

(58) Field of Classification Search
USPC ........................................ 363/131, 20, 21.02
See application file for complete search history.

(56) References Cited

U.S. PATENT DOCUMENTS

| | | | |
|---|---|---|---|
| 5,166,869 A * | 11/1992 | Hesterman | 363/25 |
| 5,285,368 A * | 2/1994 | Ishikawa | 363/21.05 |
| 5,424,615 A | 6/1995 | Kang | |
| 5,570,278 A | 10/1996 | Cross | |
| 5,712,772 A | 1/1998 | Telefus et al. | |
| 6,297,976 B1 * | 10/2001 | Isono | 363/65 |
| 6,654,258 B2 | 11/2003 | Imamura | |
| 2005/0099143 A1 * | 5/2005 | Kohno | 315/312 |
| 2008/0298093 A1 * | 12/2008 | Jin et al. | 363/21.06 |
| 2008/0310190 A1 * | 12/2008 | Chandrasekaran et al. | 363/17 |
| 2009/0154202 A1 * | 6/2009 | Takatsuka et al. | 363/40 |

(Continued)

FOREIGN PATENT DOCUMENTS

| | | |
|---|---|---|
| EP | 0261894 A1 | 3/1988 |
| JP | 2-78196 A | 3/1990 |

(Continued)

OTHER PUBLICATIONS

European Search Report dated Sep. 8, 2011, issued in corresponding European Patent Application No. 11159386.9.

(Continued)

*Primary Examiner* — Emily P Pham
(74) *Attorney, Agent, or Firm* — Westerman, Hattori, Daniels & Adrian, LLP

(57) ABSTRACT

The high voltage inverter device receives, as an input voltage, a DC voltage or a voltage within Safety Extra Low Voltage composed of a DC component with a pulsating flow superposed thereon. The input voltage is switched by a switching element to pass an exciting current to excitation windings on a primary side of a plurality of separate transformers having same characteristics to simultaneously excite the excitation windings. Output windings of the plurality of transformers are connected in parallel or in series with one another, and time axes of waveforms of output voltages of the output windings are synchronized. Thereby, a high-power high voltage is outputted continuously, stably, and safely from both ends of the output windings connected in parallel or in series.

3 Claims, 8 Drawing Sheets

(56) References Cited

U.S. PATENT DOCUMENTS

2009/0237968 A1* 9/2009 Dooley ............................ 363/97
2011/0032732 A1* 2/2011 Hsu ............................ 363/21.14

FOREIGN PATENT DOCUMENTS

| JP | 6-203974 A | 7/1994 |
|---|---|---|
| JP | 8-205535 A | 8/1996 |
| JP | 10-144544 A | 5/1998 |
| JP | 2000-50632 A | 2/2000 |
| JP | 3152298 B2 | 4/2001 |
| JP | 2002-199720 A | 7/2002 |
| JP | 2006-127789 A | 5/2006 |
| WO | 98/12799 A1 | 3/1998 |
| WO | 2007/145459 A1 | 12/2007 |

OTHER PUBLICATIONS

European Office Action dated Jun. 12, 2012, issued in corresponding European Patent Application No. 11159386.9.
Japanese Office Action dated Dec. 24, 2013, issued in corresponding Japanese Patent Application No. 2011-067584 (4 pages). (The English translation is available to the U.S. PTO through the Dossier Access System.).
Notification of Reason for Refusal dated Aug. 5, 2014, issued in Japanese Patent Application No. 2011-067584 (4 pages).

* cited by examiner

F I G. 1 0
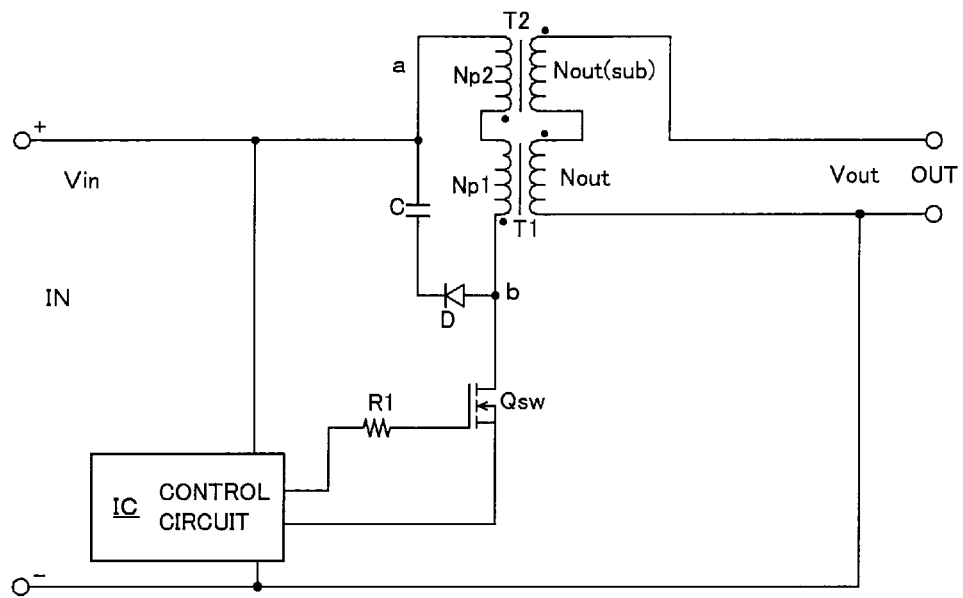
F I G. 1 1
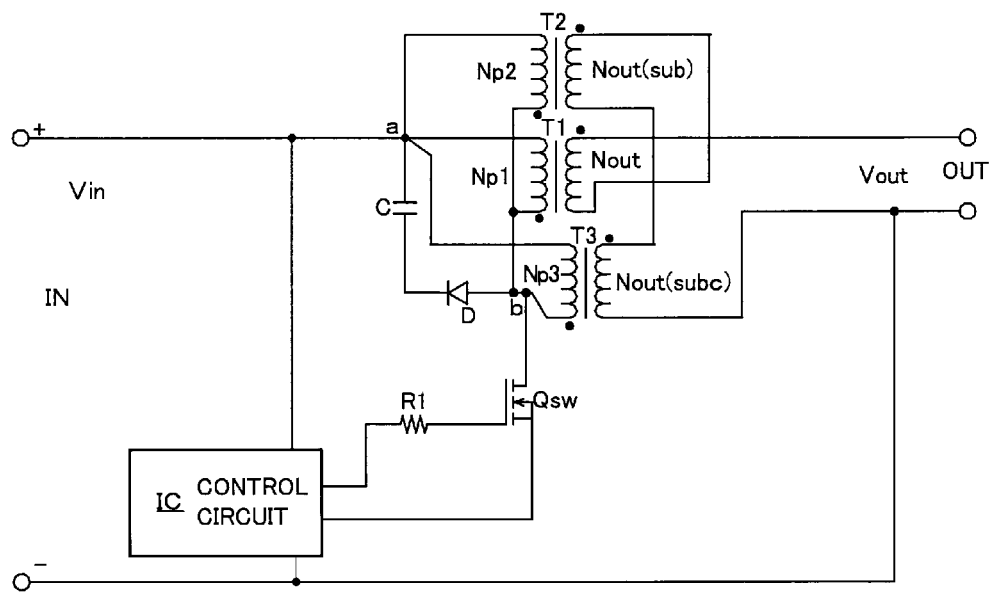

HIGH VOLTAGE INVERTER DEVICE FOR DELIVERING A HIGH-POWER AC HIGH VOLTAGE

BACKGROUND OF THE INVENTION

1. Field of the Invention

The invention relates to a high voltage inverter device such as a switching regulator, an inverter or the like used in a high voltage power supply unit, a power supply unit for discharge or the like.

2. Description of the Related Art

Atmospheric pressure plasma is applied to various industrial products as a means for surface treatment for improvement of surface quality, removal of contamination or the like. In the case where adhesion, printing, coating or the like is applied to a resin of the like, performing pre-treatment using the atmospheric pressure plasma can improve the wettability thereof.

For example, when trying to coat a printed matter which has been printed with a resin toner by an electrophotographic image forming apparatus with an ultraviolet cure varnish, the varnish on a part printed with the resin toner may be rejected due to a wax component contained in the resin toner. However, performing surface treatment using the atmospheric pressure plasma improves the wettability and therefore enables vanish coating, resulting in improved added value of the printed matter. In order to generate the atmospheric pressure plasma, a high voltage is required and the high voltage is required to be safely obtained by an inverter device.

In an AC inverter device generating a high voltage of several KV or more than 10 KV to 20 KV easily generating the atmospheric pressure plasma, the high voltage within the voltage range can cause electric shock, or ignition, smoking or the like due to spark and is extremely dangerous to the human body. On the other hand, in the safety standard of International Standards IEC60950 (J60950), the input voltage is safe when it is within 60 VDC that is SELV (Safety Extra Low Voltage) or its voltage peak value does not exceed 42.4V. Therefore, it is essential to form a configuration that a voltage within SELV is used as the input voltage of the inverter and a supply power is limited on the input side even if components of the inverter circuit have a dielectric breakdown for any cause.

Hence, as the configuration of the whole power supply unit, there is a unit, which uses the commercial input power supply, brings the output voltage range of its power supply circuit to a voltage within SELV, and generates a high voltage by a high voltage inverter using the voltage as its input.

When the input voltage is within SELV, a boost ratio n that is several tens of times to several hundreds of times the input voltage is required in order to obtain a predetermined output Vout. Here, assuming that $$n=Vout/SELV$$

when Vout=15 KV and SELV=48 V, a boost of n=312.5 times is required.

To realize this, there are circuits such as an N-time rectifying circuit and the like such as a transformer, a Cockcroft-Walton circuit and the like. However, the N-time rectifying circuits such as the Cockcroft-Walton circuit and the like perform charge/discharge by a capacitor and can extract an instantaneous single output but have difficulty in continuously extracting output power. Accordingly, there is no choice but to depend on a large-size transformer in order to obtain a stable output.

Comparing this to an article, moving a light article to a high position is comparatively easy, but lifting a heavy article to the high position requires a huge amount of work. Also in the high voltage inverter device, it is necessary to obtain an output power corresponding to a sum of load (weight)×moving distance×height that is not very small several mW but several tens W to several hundreds W.

The general definition to determine the transformer is expressed by the following expressions. Specifically, the number of windings Np of the excitation winding, the current Ip flowing through the excitation winding, and the number of windings Nout of the output winding are obtained by the following expressions.

$$Np=Vin \cdot Ton/Ae \cdot B$$

$$Ip=Nout \cdot Iout/Np$$

$$Nout=Vout \cdot Np \cdot Ton/Vin$$

Here,
Ton: time ratio (sec)
Ae: effective sectional area ($cm^2$) of core
B: magnetic flux density (gauss) Vin: input voltage
Vout: output voltage (V) Iout: output current (A)

As is appreciated from the definitions, the relation between the magnetic flux density B of a core included in the transformer or the effective sectional area Ae and the number of windings Np of the excitation winding is in inverse proportion, so that there is a limitation. It is necessary that the number of windings Nout of the output winding is a positive integer number that is as small as possible. However, if the number of windings is small, the magnetic flux density B of core is increased to increase the loss, and the core goes into magnetic saturation and loses the function as the transformer. Alternatively, if the number of windings is too large, the winding length is increased, resulting in increased loss due to the current flowing therethrough.

As depicting by a B-H curve of a ferrite core in FIG. 13, the magnetic flux density B of core changes in almost proportional to the intensity H of the magnetic field only in a specific range indicated by ΔB and the core reaches magnetic saturation when the intensity H of the magnetic field exceeds the range indicated by ΔB. Accordingly, the core functions as a transformer only within the range. On the B-H curve depicted in FIG. 13, the area of a portion surrounded by paths when the intensity H of the magnetic field increases and decreases (an oblique line portion) is generally called a hysteresis loss (core loss). For such a reason, the number of windings Np of the excitation winding is only within a specific range, and the output that can be extracted from the transformer depends on the combination of the number of windings Np of the excitation winding and the magnetic flux density B of core but is eventually limited to the specific range.

If a necessary and sufficient magnetic flux B can be extracted, the deterioration in characteristics of the transformer which will be described below is not caused. However, the magnetic flux is actually not sufficient due to the material of core (for example, there are ferrite 0.2 to 0.3 tesla, silicon steel plate 1 tesla: however, depending on the frequency desired to be used, amorphous 1 tesla, permalloy and the like).

Further, the number of windings Np of the excitation winding and the number of windings Nout of the output winding are in a proportional relation. What is a technical problem here is that since generally the sizes of Np and Nout are decided substantially by the output voltage, the number of windings Nout of the output winding necessarily becomes large when the input voltage Vin is low and the boost ratio n is very high, thus causing an increase in inter-winding capacitance and an increase in inter-layer capacitance and so on. This causes the following problems.

An inductance required as a transformer cannot be obtained at an operating frequency desired to be used.
The range of frequency of the transformer is narrow.
The dielectric loss increases.
The loss due to proximity effect caused by a high voltage increases.
These decrease the performance of the transformer.

Hence, conventional switching converters include one that is described, for example, in Patent Document 1 (JP H10-144544 A), and this switching converter is a separately-excited ON-OFF DC power supply that has a DC input power supply, a primary winding (excitation winding) having divided windings in one transformer, and two output windings on the output side thereof.

Further, a high voltage power supply circuit described in Patent Document 2 (JP 3152298 B) switches the exciting current of two primary windings (excitation windings) of an insulated high-voltage transformer by a pair of switching elements having an ON duty fixed to 50% and operating in a push-pull mode, and rectifies and smoothes the output of one secondary winding (output winding) to obtain a DC high voltage.

SUMMARY OF THE INVENTION

However, each of the switching converter described in the above Patent Document 1 and the high voltage power supply circuit described in the above Patent Document 2 has a plurality of excitation windings and output windings in one transformer and rectifies and smoothes each output taking the middle point of the output winding or simply rectifies and smoothes the AC output on the secondary side and uses it as a DC output. For this reason, it was impossible to wind a large number of output windings, failing to continuously output a high voltage (several tens W to several hundreds W) at a high boost ratio.

Further, these devices are intended to utilize the magnetic flux density of the transformers as much as possible, but when further boosting the voltage, the magnetic flux density saturates, causing a problem that the voltage cannot be boosted any more.

The invention has been made to solve the above problems, and its object is to obtain a high-power AC high voltage continuously, stably, and safely by a high voltage inverter device.

To achieve the above object, the invention is a high voltage inverter device that receives, as an input voltage, a DC voltage or a voltage within Safety Extra Low Voltage (SELV) composed of a DC component with a pulsating flow superposed thereon, switches the input voltage to pass an exciting current to an excitation winding on a primary side of a transformer, and outputs a high voltage from an output winding on a secondary side of the transformer, wherein the transformer is composed of a plurality of separate transformers having same characteristics, excitation windings of the plurality of transformers are connected in parallel and simultaneously excited, output windings of the plurality of transformers are connected in parallel or in series with one another, and time axes of output voltage waveforms of the output windings are synchronized.

Further, the excitation windings of a plurality of separate transformers having same characteristics may be connected in series and simultaneously excited. Each of the plurality of transformers is preferably a resonant transformer.

With the high voltage inverter device according to the invention, a high-power high voltage can be continuously, stably, and safely obtained using the above-described configuration.

The above and other objects, features and advantages of the invention will be apparent from the following detailed description which is to be read in conjunction with the accompanying drawings.

BRIEF DESCRIPTION OF THE DRAWINGS

FIG. 10 is a circuit diagram of a fourth embodiment of a high voltage inverter device according to the invention;
FIG. 11 is a circuit diagram of a fifth embodiment of a high voltage inverter device according to the invention.

DETAILED DESCRIPTION OF THE PREFERRED EMBODIMENTS

Hereinafter, embodiments to carry out the invention will be concretely described based on the drawings.

First Embodiment

Figure 1:
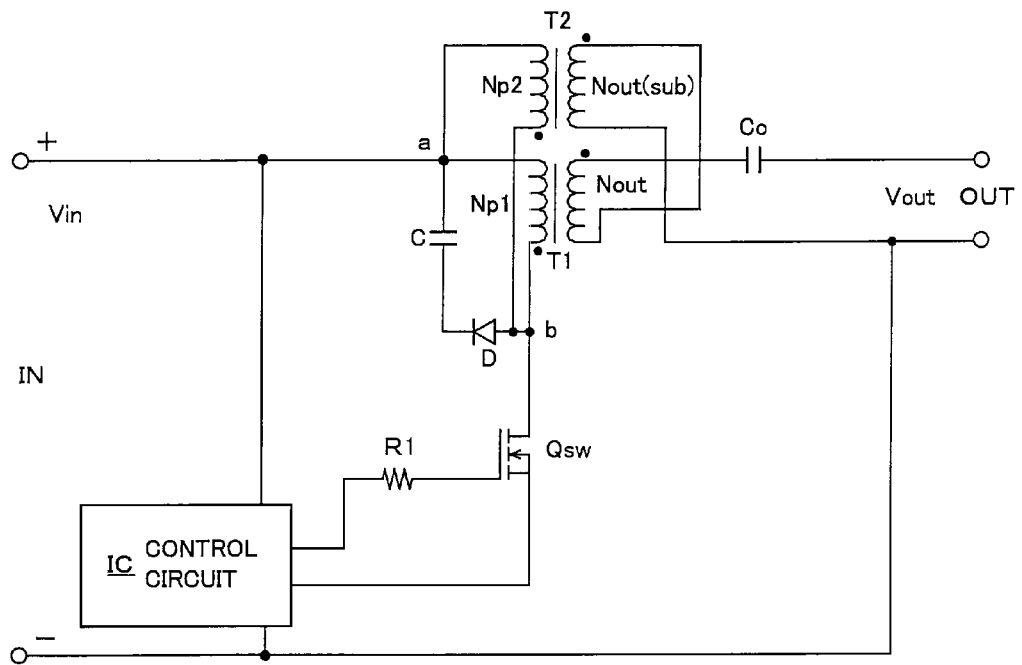
FIG. 1 is a circuit diagram of a first embodiment of a high voltage inverter device according to the invention.

A first embodiment (an example of parallel excitation and voltage addition) of a high voltage inverter device according to the invention will be described with reference to FIG. 1. FIG. 1 is a circuit diagram illustrating its configuration in which IN denotes an input terminal and OUT denotes an output terminal (this applies to the following embodiments).

This high voltage inverter device receives, as an input voltage Vin, a DC voltage (60 V or less) or a voltage within SELV (Safety Extra Low Voltage) composed of a DC component with a pulsating flow superposed thereon which is supplied through the input terminal IN, switches the input voltage Vin by a switching element Qsw to pass exciting current to excitation windings Np1, Np2 on the primary side of a first transformer T1 and a second transformer T2, and outputs high voltages from output windings Nout, Nout(sub) on the secondary side of the transformers T1, T2 to output an output voltage Vout being an AC high voltage from the output terminal OUT to a load.

The first transformer T1 and the second transformer T2 are separate transformers having the same characteristics and have the respective excitation windings Np1, Np2 which are connected in parallel between an a point on the positive electrode side of the input power supply and a b point on the positive electrode side of the switching element Qsw composed of an FET.

Between the a point and the b point, a capacitor C having one end connected to the a point and a diode D having the anode connected to the b point are connected in series to constitute a snubber circuit. The snubber circuit is provided for resetting the first and second transformers T1, T2 and for suppressing the voltage of the switching element Qsw. As the snubber circuit, other than the above-described series circuit of the diode D and the capacitor C, there is a so-called RC snubber circuit having a resistor R connected in parallel to the capacitor C though not shown.

Figure 2:
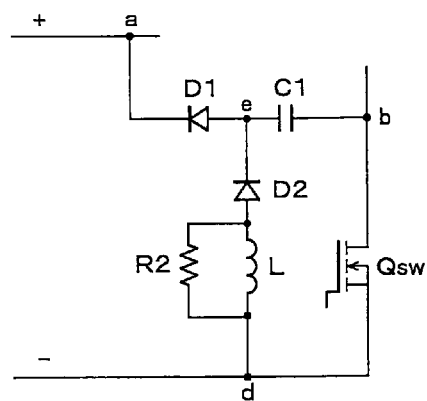
FIG. 2 is a circuit diagram illustrating a different example of a snubber circuit.

Further, there may be a snubber circuit in which, as illustrated in FIG. 2, a capacitor C1 and a diode D1 are connected in this order from the b point on the positive electrode side of the switching element Qsw to the a point on the positive electrode side of the input power supply that is the order changed from the order of the diode D and the capacitor C in FIG. 1, the cathode of another diode D2 is connected to an connection point e of the capacitor C1 and the anode of the diode D1, and a parallel circuit composed of an inductor (choke coil) L and a resistor R2 is connected between the anode of the diode D2 and a d point on the negative electrode side of the switching element Qsw.

IC is a control circuit including an oscillation circuit and applies a switching pulse to the gate of the switching element Qsw via a resistor R1 to turn ON/OFF the switching element Qsw. Thereby, current is intermittently passed through the excitation windings Np1, Np2 of the first and second transformers T1, T2 to generate an AC high voltage at each output winding Nout, Nout(sub).

The separate first and second transformers T1, T2 having the same characteristics have the respective output windings Nout, Nout(sub), and the output winding Nout and the output winding Nout(sub) are connected in series such that the output winding Nout of the first transformer T1 is stacked on the output winding Nout(sub) of the second transformer T2, and not-connected terminals of the output windings Nout, Nout(sub) are connected to the output terminal OUT side.

Here, though the outputs from the output windings Nout, Nout(sub) are AC, there occurs a case that when there is little DC component, only AC is desired to be passed to the output terminal for the reason that the DC component is desired to be cut or the like. In this case, it is only necessary to dispose a capacitor $C_0$ on the line on the positive electrode side of the output. However, the invention is intended for a voltage range of several KV to 20 KV, and therefore the withstand voltage of the capacitor $C_0$ needs to be a voltage equal to or higher than the output voltage.

Figure 3:
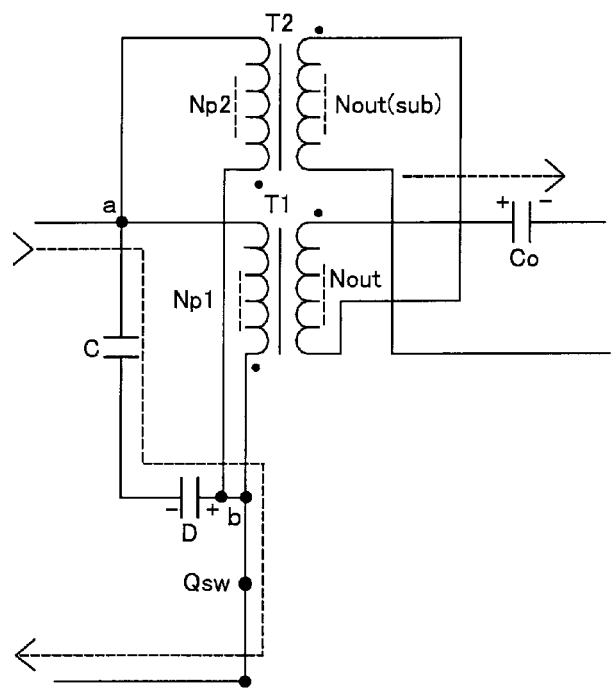
FIG. 3 is an equivalent circuit diagram at turn ON time of the first embodiment illustrated in FIG. 1.

When the switching element Qsw is turned ON (at Turn ON time), the high voltage inverter device is brought into the state as illustrated by an equivalent circuit in FIG. 3 in which current flows from the positive electrode side of the input power supply to the switching element Qsw passing through the capacitor C and the diode D (functioning as a capacitor by a junction capacitance at this time) of the snubber circuit as illustrated by a broken arrow, whereas little or no current flows through the excitation windings Np1, Np2 of the first and second transformers T1, T2 and therefore little or no induced current flows through the output windings Nout, Nout(sub).

Figure 4:
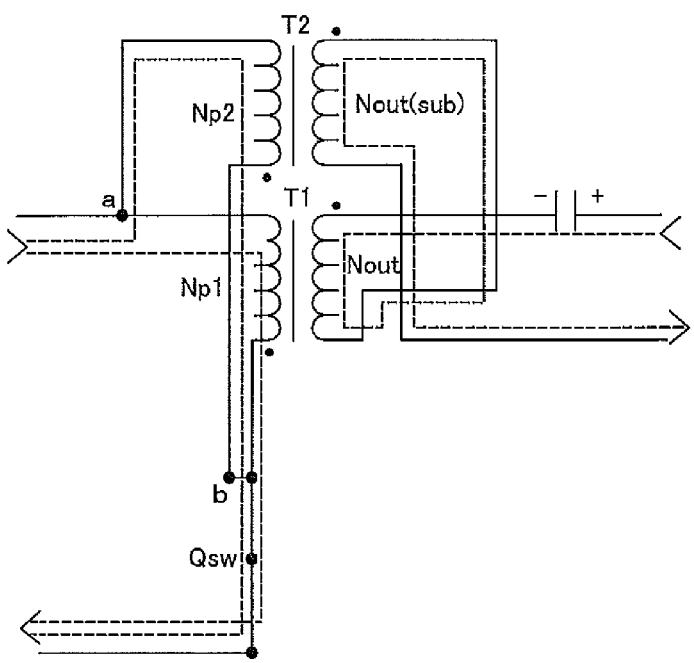
FIG. 4 is an equivalent circuit diagram during ON time of the same.

When the switching element Qsw becomes completely ON, the high voltage inverter device is brought into the state as illustrated by an equivalent circuit in FIG. 4 in which current flows from the positive electrode side of the input power supply through the excitation windings Np1, Np2 connected in parallel of the first and second transformers T1, T2 and the switching element Qsw as illustrated by a broken arrow, and induced current flows also through the output windings Nout, Nout(sub) of the first and second transformers T1, T2 as illustrated by a broken arrow, so that an output voltage is obtained.

Figure 5:
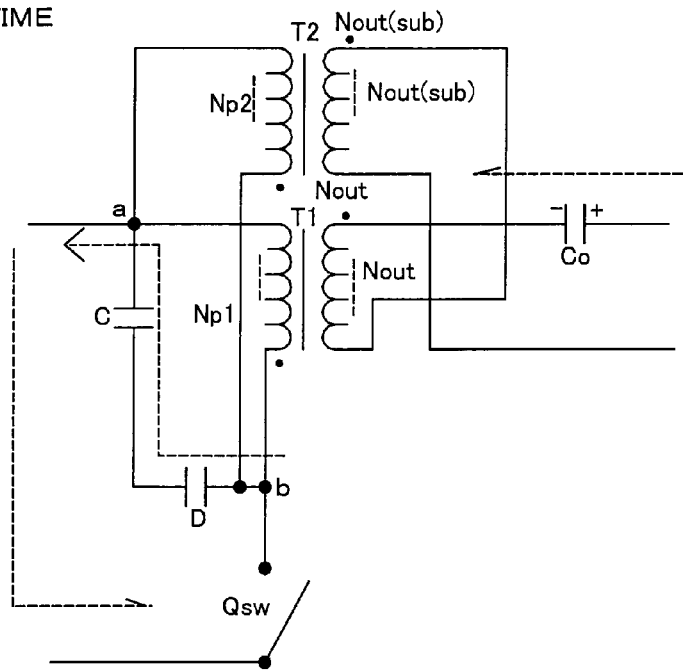
FIG. 5 is an equivalent circuit diagram at turn OFF time of the same.

When the switching element Qsw is turned OFF (at Turn OFF time), the high voltage inverter device is brought into the state as illustrated by an equivalent circuit in FIG. 5 in which charge stored in the capacitor C of the snubber circuit is discharged. In this event, the diode D functions as a capacitor by the junction capacitance during forward recovery time until the forward voltage reaches the threshold value.

Figure 6:
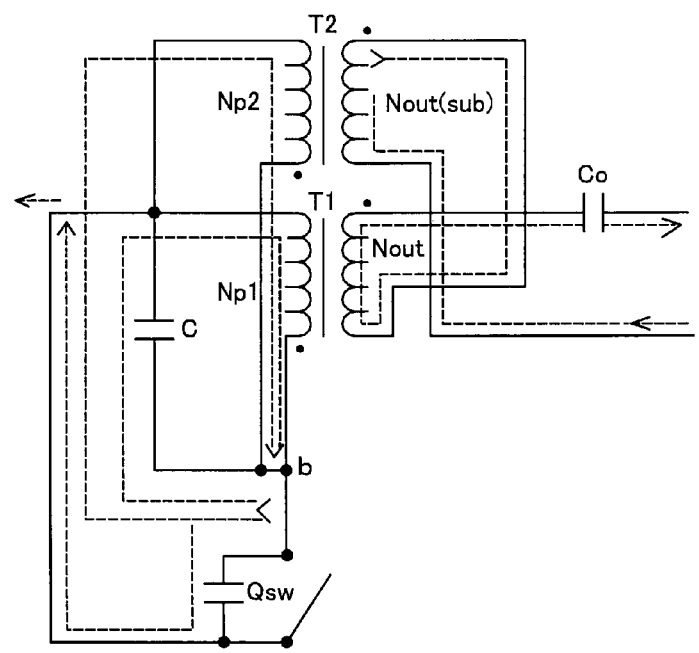
FIG. 6 is an equivalent circuit diagram during OFF time of the same.

When the switching element Qsw becomes completely OFF, the high voltage inverter device is brought into the state as illustrated by an equivalent circuit in FIG. 6 in which back electromotive voltage is generated at the excitation windings Np1, Np2 connected in parallel of the first and second transformers T1, T2 and flows through the diode D (brought into a conduction state in this event) and the capacitor C of the snubber circuit as illustrated by a broken arrow and flows also to the input power supply side between the source and drain of the opened switching element Qsw (functioning as a capacitor in this event). Back electromotive voltage is generated also at each output winding Nout, Nout(sub), thereby flowing current to the load connected to the output terminal OUT.

The switching element Qsw is periodically turned ON/OFF to repeat the above-described states. The changes in voltage waveforms at the respective parts in this event are illustrated in the timing chart in FIG. 7. The ratio of magnitudes of the waveforms, the absolute values, the ratio on the time axis, and the correlation of magnitudes in this chart are not precise.

Figure 7:
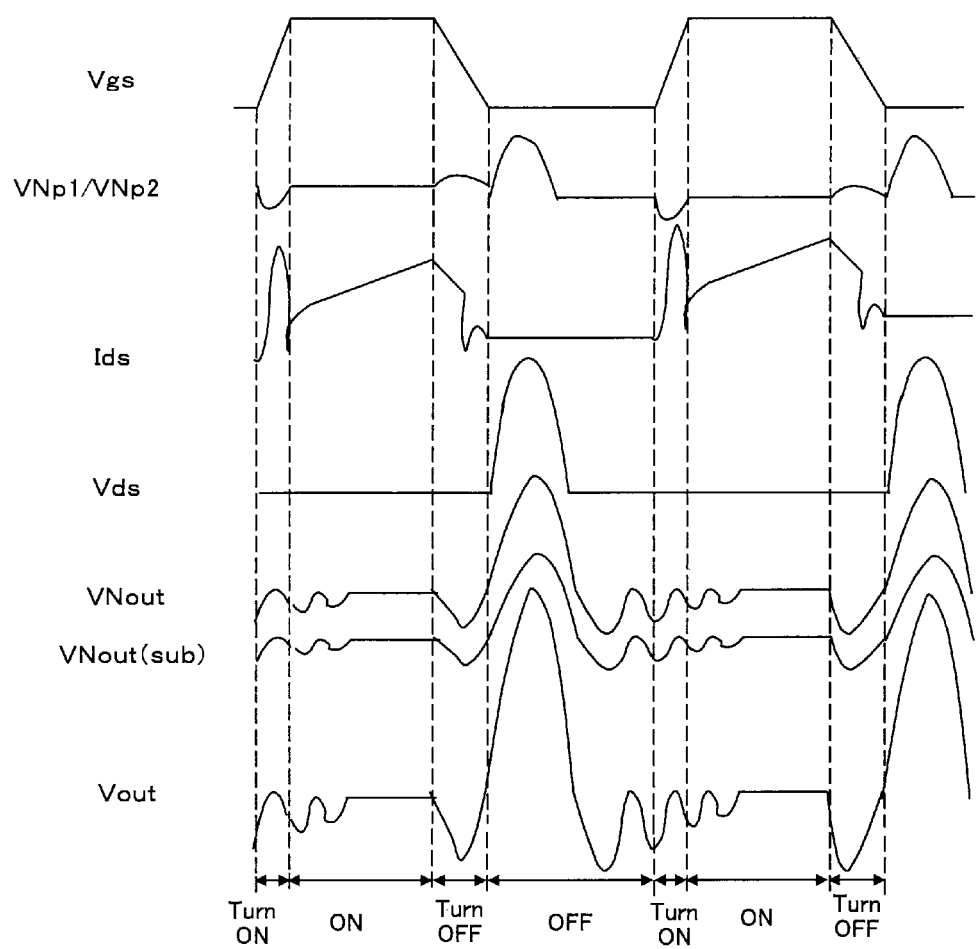
FIG. 7 is a timing chart illustrating changes in voltage waveforms at respective operating parts in the first embodiment illustrated in FIG. 1.

In FIG. 7, Vgs indicates a drive voltage (a gate-source voltage) of the switching element Qsw, VNp1, VNp2 indicate voltages of the excitation windings Np1, Np2, Ids indicates a current flowing through the switching element Qsw, Vds indicates a drain-source voltage of the switching element Qsw, VNout indicates an output voltage of the output winding Nout of the first transformer T1, VNout(sub) indicates an output voltage of the output winding Nout(sub) of the second transformer T2, and Vout indicates an output voltage from the output terminal OUT. Further, as is clear from FIG. 7, the time axes of the waveforms of the output voltages VNout and VNout(sub) of the output windings Nout and Nout(sub) are synchronized.

As described above, the high voltage inverter device according to the invention includes two or more transformers that have separate cores with completely different magnetic paths and have the same characteristics, simultaneously excites their excitation windings to synchronize the time axes of the output voltage waveforms of the output windings at the output side, and adds the currents or voltages of the outputs. In the above-described first embodiment, the outputs of the output windings Nout, Nout(sub) of the two transformers T1, T2 are accumulated by voltage addition to boost the voltage. Therefore, the number of output windings can be increased as a whole of transformers without occurrence of biased magnetization in a plurality of excitation windings, so that a high voltage at a high boost ratio can be obtained continuously, stably, and safely.

Second Embodiment

Figure 8:
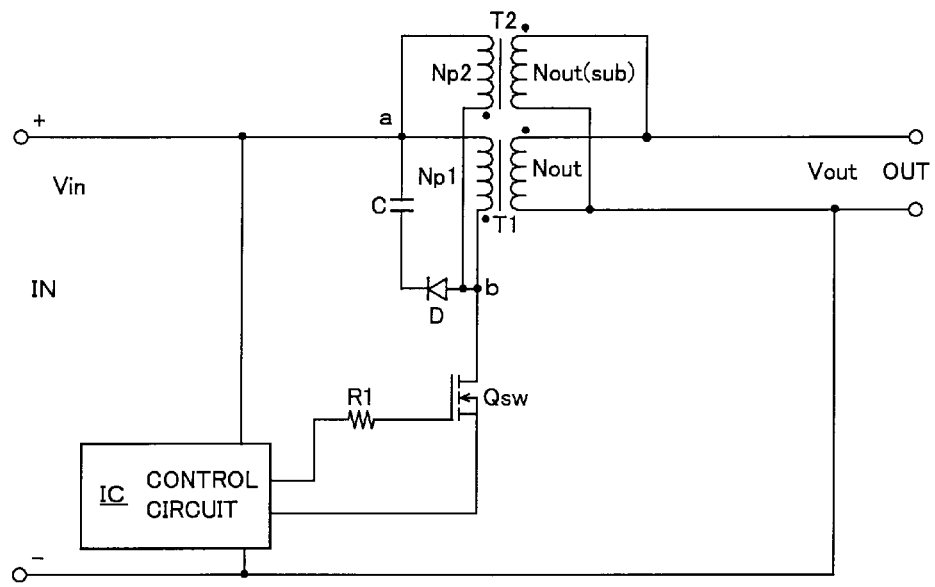
FIG. 8 is a circuit diagram of a second embodiment of a high voltage inverter device according to the invention.

Next, a second embodiment (an example of parallel excitation and current addition) of a high voltage inverter device according to the invention will be described with reference to FIG. 8. FIG. 8 is a circuit diagram illustrating its configuration.

In the second embodiment, the output windings Nout, Nout(sub) of the separate first and second transformers T1, T2 having the same characteristics are connected in parallel such that outputs thereof are subjected to current addition, and connected to the output terminal OUT side. According to this embodiment, though the output voltage is substantially the same as the case of one transformer, the output current can be doubled so that the output power can also be doubled.

That the excitation windings Np1, Np2 of the transformers T1, T2 are connected in parallel between the positive electrode of the input power supply and the positive electrode of the switching element Qsw is the same with the first embodiment. The other configuration and operation are also the same as those of the first embodiment. In the second embodiment, no capacitor $C_0$ is provided on the output line, but when the DC component of the output is desired to be cut, it is only necessary to provide a capacitor $C_0$ on the output line as in the first embodiment.

Third Embodiment

Figure 9:
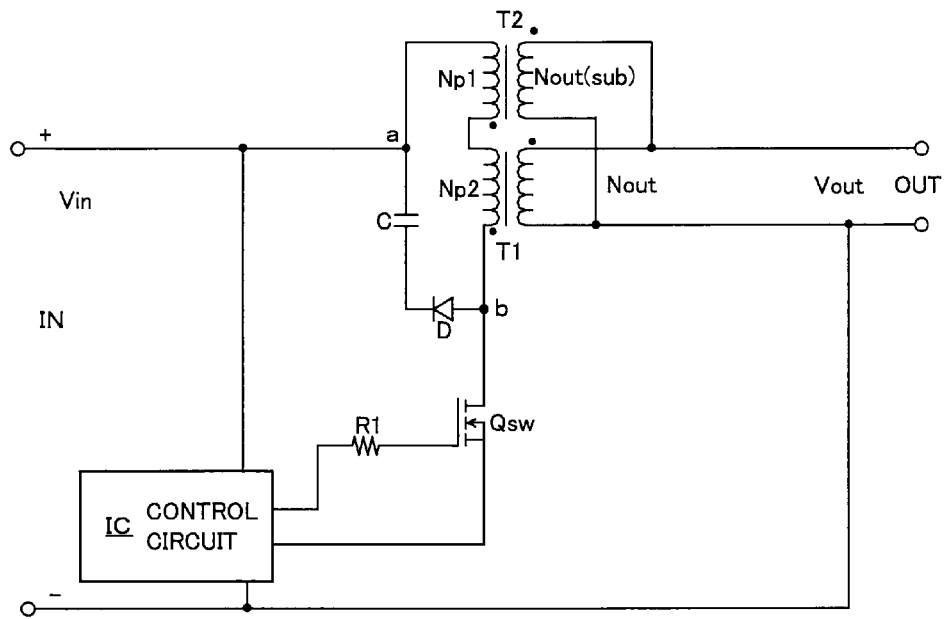
FIG. 9 is a circuit diagram of a third embodiment of a high voltage inverter device according to the invention.

Next, a third embodiment (an example of split excitation and current addition) of a high voltage inverter device according to the invention will be described with reference to FIG. 9. FIG. 9 is a circuit diagram illustrating its configuration.

In the third embodiment, the excitation windings Np1, Np2 of the separately provided first and second transformers T1, T2 having the same characteristics are connected in series between the positive electrode of the input power supply and the positive electrode of the switching element Qsw. Between the positive electrode of the input power supply and the positive electrode of the switching element Qsw, a series circuit composed of a diode D and a capacitor C constituting a snubber circuit is also connected.

The output windings Nout, Nout(sub) of the first and second transformers T1, T2 are connected in parallel such that outputs thereof are subjected to current addition, and connected to the output terminal OUT side as in the second embodiment.

The other configuration and operation are the same as those of the first embodiment except that no capacitor $C_0$ is provided on the output line.

Fourth Embodiment

Next, a fourth embodiment (an example of split excitation and voltage addition) of a high voltage inverter device according to the invention will be described with reference to FIG. 10. FIG. 10 is a circuit diagram illustrating its configuration.

In the fourth embodiment, the excitation windings Np1, Np2 of the separately provided first and the second transformers T1, T2 having the same characteristics are connected in series between the positive electrode of the input power supply and the positive electrode of the switching element Qsw as in the third embodiment. Between the positive electrode of the input power supply and the positive electrode of the switching element Qsw, a series circuit composed of a diode D and a capacitor C constituting a snubber circuit is also connected.

The output winding Nout of the first transformer T1 and the output winding Nout(sub) of the second transformer T2 are connected in series such that the output winding Nout(sub) is stacked on the output winding Nout, and respective not-connected terminals are connected to the output terminal OUT side.

The other configuration and operation are the same as those of the first embodiment except that no capacitor $C_0$ is provided on the output line.

Fifth Embodiment

Next, a fifth embodiment (an example of combination excitation and voltage addition by three transformers) of a high voltage inverter device according to the invention will be described with reference to FIG. 11. FIG. 11 is a circuit diagram illustrating its configuration.

In the fifth embodiment, separately provided three transformers having the same characteristics are used, and excitation windings Np1, Np2, and Np3 of a first transformer T1, a second transformer T2, and a third transformer T3 are connected in parallel between the positive electrode of the input power supply and the positive electrode of the switching element Qsw. All of output windings Nout, Nout(sub), and Nout(subc) of the transformers T1, T2, and T3 are connected in series, and respective not-connected terminals of the output windings Nout, Nout(subc) are connected to the output terminal OUT side.

The other configuration and operation are the same as those of the first embodiment except that no capacitor $C_0$ is provided on the output line.

According to the fifth embodiment, the outputs of the output windings Nout, Nout(sub), and Nout(subc) of the three transformers T1, T2, and T3 are accumulated by voltage addition to boost the voltage, so that a higher voltage output can be obtained.

Note that all of the excitation windings Np1, Np2, and Np3 of the three transformers T1, T2, and T3 having the same characteristics may be connected in series as in the third and forth embodiments. Further, all of the output windings Nout, Nout(sub), and Nout(subc) of the transformers T1, T2, and T3 may be connected in parallel. Further, separately provided four or more transformers having the same characteristics may be provided.

However, actually, an increase in the number of transformers makes the arrangement, pattern and so on larger to cause a problem in EMI of unnecessary radiation or the like, and therefore it seems preferable to provide up to about four transformers.

It is only necessary that the intensities of the individual magnetic fields which are substantially equally divided become necessary intensities whether the excitation windings of the transformers are connected in series or in parallel.

Further, when the DC component of the output is desired to be cut in the third to fifth embodiments, it is only necessary to provide a capacitor $C_0$ on the output line as in the first embodiment.

Resonant Transformer and Number Thereof Used

It is desirable to use a resonant transformer as each of the transformers T1 to T3 in the high voltage inverter device in the invention. In the resonant transformer, a high voltage is obtained by a flyback system, and therefore the period when energy is injected from the primary side and the period when the energy is extracted from the secondary side are alternated. In other words, the high voltage inverter device performs an operation that energy is stored in each transformer as exciting energy in the period when the switching element Qsw on the primary side is ON and the energy is discharged to the secondary side in the period when the switching element Qsw is OFF. Therefore, each transformer resonates at a self-resonant frequency fo equal to or higher than a switching frequency fsw (fsw≤fo) of the switching element Qsw.

When the time ratio between percentages of the ON period (time period) and the OFF period (time period) of application of voltage to the excitation winding is 50%, the switching frequency fsw is equal to the self-resonant frequency fo. However, in order to output a high voltage high current, it is necessary to make the ON period when the exciting energy is stored in the transformer as long as possible. This is the reason why the percentage of the ON period is set to exceed 50%, and it is desirable that the percentage of the ON period is 55% or higher in order to obtain effective output.

The switching frequency fsw is fixed at a frequency sufficiently exceeding the audio frequency, namely, a fixed frequency of, for example, 20 KHz. In addition, the frequency (1/fsw) and ON duty of the switching pulse to be outputted from the control circuit IC illustrated in FIG. 1 and so on are set in advance so that the ON duty of the switching element Qsw takes a percentage corresponding to the ON period of the above-described time ratio.

As a result of repeated experiments in the high voltage inverter device using such a resonant transformer, it was found that the following theoretical expressions are established among the input voltage: Vin, the sharpness of resonance: Qe, the drain-source voltage of the switching element Qsw: Vds, the output voltage: Vout, the winding ratio (the number of turns of the output winding/the number of turns of the excitation winding): Nps, and the number of transformers: N.

$$Vds = Vout/(N \cdot Nps)$$

$$Vout = Qe \cdot Vin$$

Accordingly, the output voltage Vout is proportional to the sharpness of resonance Qe, so that a sufficient boost can be achieved by making Qe large even if the winding ratio is not set to so large.

Here, the sharpness of resonance Qe will be described. Taking up the characteristics of the resonant current to the frequency, the resonant current reaches a maxim value at the resonant frequency fo, and assuming that a width of the frequency when the resonant current becomes $1/\sqrt{2}$ of the maxim value (referred to as a half-value breadth) at frequencies around the resonant frequency fo is $\Delta f$, the sharpness of resonance is a dimensionless number expressed by Qe=fo/$\Delta f$.

Figure 12:
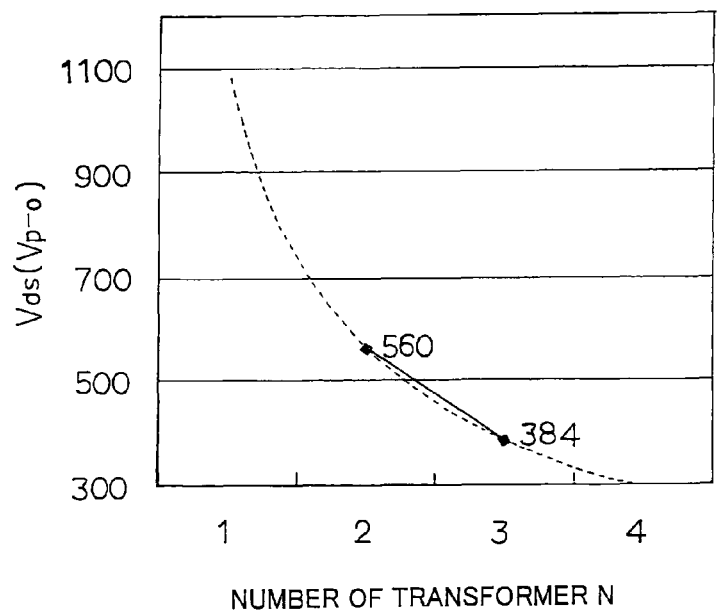
FIG. 12 is a curve graph representing the relation between the number of transformers and the crest value of the drain-source voltage of a switching element in the high voltage inverter device according to the invention.
Figure 13:
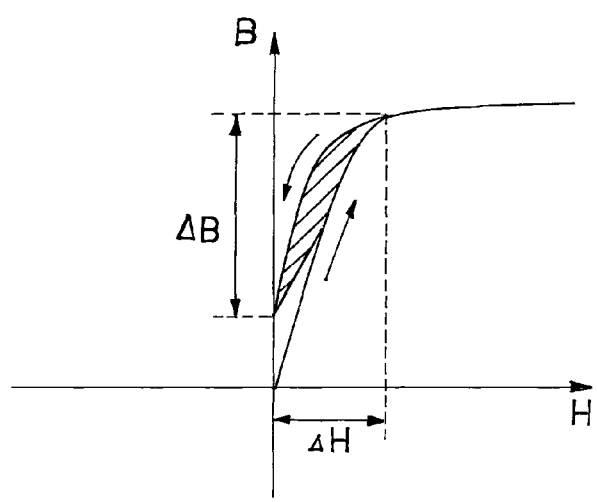
FIG. 13 is a graph illustrating a B-H curve of a core of a general transformer.

When the plurality of transformers (resonant transformers) are configured such that the excitation windings thereof are connected in parallel and the output windings thereof are connected in series as in the embodiments illustrated in FIG. 1 and FIG. 11, the relation between the number of transformers N and the crest value Vds (Vp-0) of the drain-source voltage of the switching element Qsw when Qe was fixed changed as depicted by a curve illustrated in FIG. 12.

More specifically, a larger decrease in the crest value Vds (Vp-0) of the drain-source voltage was found as the number of connected transformers N increased. In the example illustrated in FIG. 12, Vds (Vp-0) is 560V when two transformers are used, whereas Vds (Vp-0) is 384V when three transformers are used in the example illustrated in FIG. 12.

This means that the required withstand voltage of the switching element Qsw may be lower as the number of connected transformers is increased, meaning that an element with a lower ON resistance can be used in MOSFET. For example, only two MOSFETs driven in parallel may be sufficient for the case where three MOSFETS are normally required to be driven in parallel.

As an actual example, in the case where the input voltage Vin is 56V, the output voltage Vout is 10.5 KV, and the average output is 20 W to 800 W, while the withstand voltage is 900V when two transformers are used, the withstand voltage is 600V when three transformers are used. Thus, the ON resistance of the switching element Qsw significantly decreases and the efficiency (output power/input power) greatly increases. In the case of the embodiment illustrated in FIG. 11, the efficiency of 79.4% could be obtained.

Without consideration of the loop length and the area of the transformer arrangement, a larger number of transformers improves the efficiency and contributes to reduction of noise such as unnecessary radiation. However, actually, the loop length and the installation area increase according to the number of transformers to cause a problem of occurrence of unnecessary radiation and device size, and therefore it seems that up to about four is the practical range of the number of transformers.

Though embodiments of the high voltage inverter device according to the invention have been described above, the invention is not limited to the embodiments and may be variously changed, and the embodiments can also be carried out in arbitrary combinations without contradiction.

The invention can be used for a high voltage generating device such as a switching regulator, an inverter, a high voltage power supply, a power supply for discharge or the like. Especially, the invention is suitable to obtain continuously, stably, and safely a high-power high voltage for generating atmospheric pressure plasma for performing surface treatment or the like of a printed matter.

What is claimed is:

1. A high voltage inverter device that receives, as an input voltage, a DC voltage or a voltage composed of a DC component with a pulsating flow superposed thereon, switches the input voltage to pass an exciting current to an excitation winding on a primary side of a transformer, and outputs a high voltage from an output winding on a secondary side of said transformer,
    wherein said transformer is composed of a plurality of separate transformers having same characteristics, excitation windings of said plurality of transformers are connected in parallel and simultaneously excited, output windings of said plurality of transformers are connected in parallel or in series with one another, and time axes of output voltage waveforms of the output windings are synchronized, and
    wherein each of said plurality of transformers is a resonant transformer whose output voltage is proportional to a sharpness of resonance Qe.

2. The high voltage inverter device according to claim 1, wherein said plurality of transformers are composed of three transformers having same characteristics, excitation windings of said three transformers are connected in parallel and simultaneously excited, and output windings of said three transformers are connected in series with one another.

3. A high voltage inverter device that receives, as an input voltage, a DC voltage or a voltage composed of a DC component with a pulsating flow superposed thereon, switches the input voltage to pass an exciting current to an excitation winding on a primary side of a transformer, and outputs a high voltage from an output winding on a secondary side of said transformer, wherein said transformer is composed of a plurality of separate transformers having same characteristics, excitation windings of said plurality of transformers are connected in series and simultaneously excited, output windings of said plurality of transformers are connected in parallel or in series with one another, and time axes of output voltage waveforms of the output windings are synchronized, and wherein each of said plurality of transformers is a resonant transformer whose output voltage is proportional to a sharpness of resonance $Q_e$.

* * * * *